(12) United States Patent
Shaw et al.

(10) Patent No.: US 6,626,269 B2
(45) Date of Patent: Sep. 30, 2003

(54) ZERO DRAG DISC BRAKE WITH ANTI-KNOCK-BACK DEVICE

(75) Inventors: Schuyler Scott Shaw, Dayton, OH (US); Bryan Peter Riddiford, Dayton, OH (US); John Benjamin Hageman, Vandalia, OH (US); Donald Edward Schenk, Vandalia, OH (US); David Bernard Drennen, Bellbrook, OH (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/990,089

(22) Filed: Nov. 21, 2001

(65) Prior Publication Data

US 2002/0063022 A1 May 30, 2002

Related U.S. Application Data

(63) Continuation-in-part of application No. 09/633,942, filed on Aug. 8, 2000, now Pat. No. 6,481,543.

(51) Int. Cl.[7] .............................................. F16D 55/36
(52) U.S. Cl. .................. 188/71.7; 188/196 V; 188/71.9
(58) Field of Search ............................... 188/71.7, 71.8, 188/71.9, 196 A, 196 F, 196 P, 196 B, 196 D, 196 V

(56) References Cited

U.S. PATENT DOCUMENTS

| 3,590,964 | A | * | 7/1971 | Krause | 188/71.9 |
|---|---|---|---|---|---|
| 3,860,095 | A | | 1/1975 | Morris | 188/71.8 |
| 4,381,047 | A | | 4/1983 | Gregoire et al. | 188/71.8 |
| 4,540,068 | A | | 9/1985 | Ritsema | 188/71.8 |
| 4,602,702 | A | | 7/1986 | Ohta et al. | 188/71.7 |
| 5,148,894 | A | | 9/1992 | Eddy, Jr. | 188/72.6 |
| 5,161,650 | A | | 11/1992 | Taig | 188/71.9 |
| 5,219,047 | A | | 6/1993 | Fouilleux et al. | 188/71.9 |
| 5,443,141 | A | * | 8/1995 | Thiel et al. | 188/71.9 |
| 5,628,387 | A | | 5/1997 | Schantzen | 188/71.9 |
| 6,000,507 | A | | 12/1999 | Bohm et al. | 188/71.9 |
| 6,145,633 | A | | 11/2000 | Niederstadt et al. | 188/71.8 |
| 6,250,434 | B1 | | 6/2001 | Baumgartner et al. | 188/71.8 |

* cited by examiner

Primary Examiner—Jack Lavinder
Assistant Examiner—Thomas J. Williams
(74) Attorney, Agent, or Firm—Robert M. Sigler

(57) ABSTRACT

A disc brake caliper assembly has a housing with a bore. A piston in the bore is movable between applied, retracted and knock-back positions. The piston is activatable by hydraulic pressure to move from the retracted position to the applied position; and a retracting seal is effective in the absence of the hydraulic pressure to move the piston from the applied position to the retracted position. A linkage adjacent the piston carries a stop; and an actuator is responsive to an end of brake activation signal to cause the linkage to engage the stop with the piston when the piston is retracted from its applied position to its retracted position so as to prevent the piston from moving from the retracted position to the knock-back position. The actuator is preferably a comparatively weak electric motor that stalls as the stop engages the piston; and the stall is sensed to end motor activation. The end of brake activation signal is preferably provided by a brake position or pressure sensor. The apparatus is adaptable to an electronic park brake control.

5 Claims, 1 Drawing Sheet

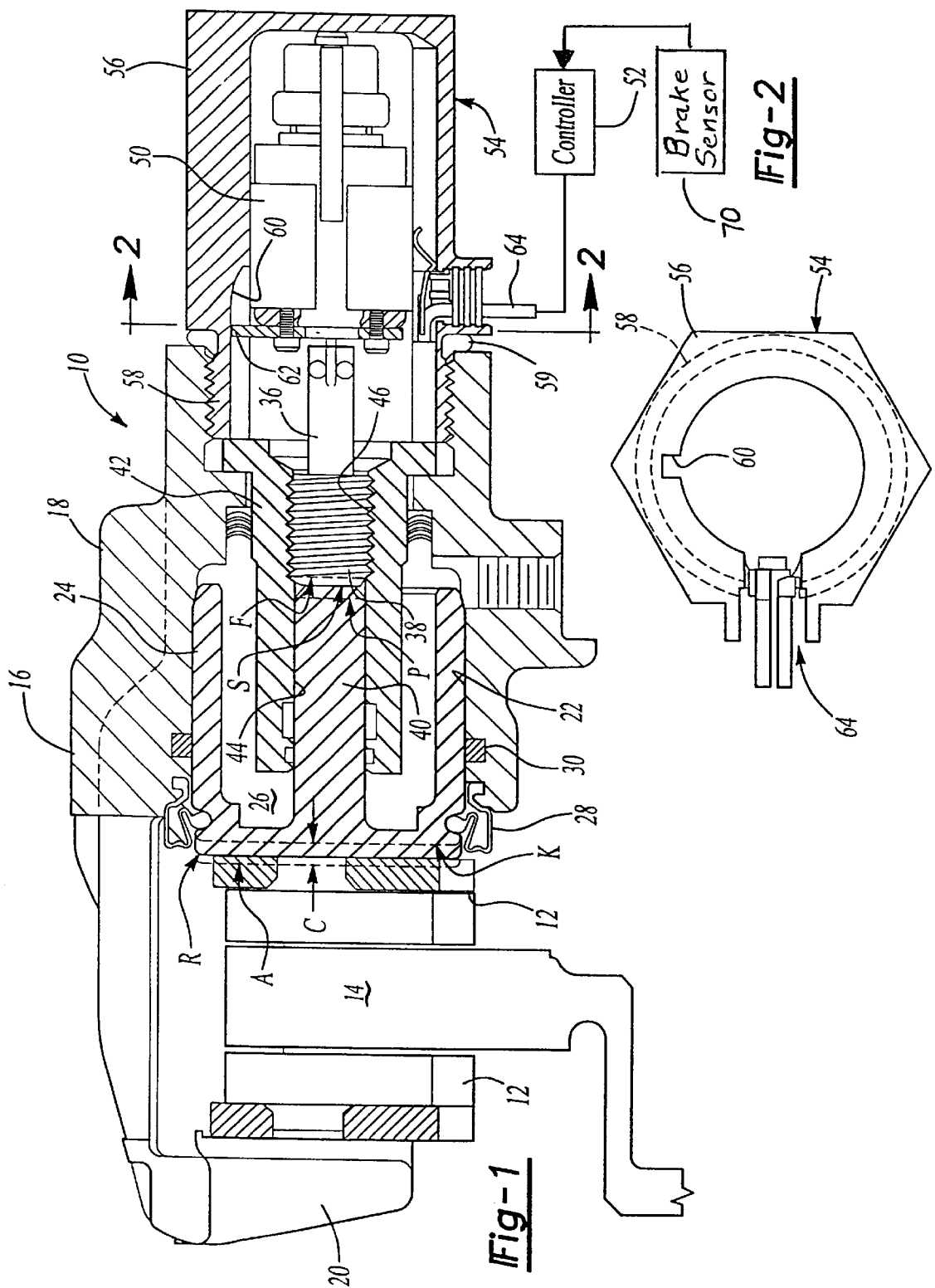

ZERO DRAG DISC BRAKE WITH ANTI-KNOCK-BACK DEVICE

REFERENCED APPLICATION

This application is a Continuation-in-Part of U.S. Ser. No. 09/633,942, now U.S. Pat. No. 6,481,543, filed Aug. 8, 2000.

TECHNICAL FIELD

This invention relates to a disc brake caliper assembly, and more specifically, the invention relates to a disc brake caliper assembly that prevents piston knock-back.

BACKGROUND OF THE INVENTION

Disc brake caliper assemblies are widely used in the automotive industry for applying a braking force to the wheels of a vehicle. The wheels are secured to a brake rotor, which has brake pads arranged on either side of its braking surfaces. A piston supported in the caliper housing forces the pads together and into engagement with the rotor when the vehicle operator depresses the brake pedal. Ideally, the brake pads do not engage the rotor when the brakes are not applied, which is a condition known as zero drag, so that frictional losses that reduce fuel economy are prevented. Typically, a retraction seal is used between the caliper housing and the piston to automatically retract the piston when the brakes are not applied.

Under severe operating conditions, the rotor may deflect due to vibrations or harsh road inputs. A deflected rotor may push back on the brake pads and force the piston into the caliper housing. As a result, an undesirable clearance between the rotor and brake pad may be created which increases the distance the operator must depress the brake pedal. Passive anti-knock-back devices have been employed, such as resilient rings, to prevent the piston from being forced into the caliper housing. However, as with many passive devices, the prior anti-knock-back device lacks fine control and responsiveness.

Electric parking brake actuators have been used to replace the mechanical devices typically employed to apply the parking brake. The electric actuators lock the piston in place once the brake pads have been forced together about the rotor. However, these actuators have been underutilized in that they only have been used for the limited purpose of applying the parking brake. Therefore, what is needed is an active anti-knock-back device that also may be incorporated into the electric parking brake actuator.

SUMMARY OF THE INVENTION

The present invention provides a disc brake caliper assembly having a housing with a bore and a piston disposed within the bore and movable between applied, retracted and knock-back positions. The piston is activatable by hydraulic pressure to move from the retracted position to the applied position; and a retracting seal is effective in the absence of the hydraulic pressure to move the piston from the applied position to the retracted position. A linkage adjacent the piston carries a stop; and an actuator is responsive to an end of brake activation signal to cause the linkage to engage the stop with the piston when the piston is retracted from its applied position to its retracted position so as to prevent the piston from moving from the retracted position to the knock-back position.

The actuator is preferably an electric motor that is ineffective to move the piston, through the linkage and stop, from the retracted position to the applied position. Thus, the motor may be activated to move the stop into engagement with the piston and then stall, with the stall being detected, for example by detecting a motor stall current increase; and the motor may then be deactivated in response. The end of brake activation signal is preferably provided by a brake position or pressure sensor.

The present invention prevents piston knock-back by moving the stop as required to engage the piston after each retraction of the piston into its retracted position, so that the piston cannot be knocked back by the brake disc beyond the retracted position. In so doing, the present invention automatically adjusts itself to brake pad wear as an additional benefit. Additionally, the apparatus of the invention is adaptable for use in an electronic parking brake with some additional software programming of the controller.

BRIEF DESCRIPTION OF THE DRAWINGS

Other advantages of the present invention can be understood by reference to the following detailed description when considered in connection with the accompanying drawings wherein:

FIG. 1 is a cross-sectional view of the disc brake caliper assembly of the present invention; and FIG. 2 is a cross-sectional view of an actuator housing taken along line 2—2 of FIG. 1.

DESCRIPTION OF THE PREFERRED EMBODIMENT

A disc brake caliper assembly 10 is shown in FIG. 1. The assembly 10 carries a pair of spaced apart brake pads 12 that are arranged on either side of a rotor 14. A wheel (not shown) is secured to rotor 14 so that as frictional force is applied to rotor 14 by brake pads 12 friction will increase between the wheel's tire and the roadway thereby slowing the vehicle. Caliper assembly 10 includes a body 16 having a housing 18 and a flange 20 opposite the housing 18, which supports one of the brake pads 12. Housing 18 includes a bore 22 with a piston 24 disposed therein. The other brake pad 12 is supported adjacent to piston 24.

A dust seal 28 is arranged between housing 18 and piston 24 for preventing debris from entering bore 22 and interfering with the operation of caliper assembly 10. Piston 24 and bore 22 define a hydraulic brake chamber 26. When the operator applies the brake pedal, hydraulic fluid fills chamber 26 forcing piston 24 from bore 22 to squeeze rotor 14 with brake pads 12 and create a frictional braking force. A retraction seal 30 is arranged between piston 24 and housing 18 to retract the piston from an applied position, A, in which brake pads 12 engage rotor 14 to a normal retracted position, R, once the brake pedal has been released. In the normal retracted position, R, piston 24 does not force brake pads 12 into engagement with rotor 14. Retraction seal 30 is a standard retraction seal use in disc brake assemblies that is resiliently distorted by movement of the piston advancing the pad into its applied position A and which returns the piston to its retracted position R when the hydraulic braking pressure is released. Seal 30 ensures that piston 24 is sufficiently pulled away from rotor 14 such that brake pads 12 do not "drag" against rotor 14 to prevent frictional losses. Seal 30 also determines that the retracted position R is determined as an essentially predetermined distance from the applied position A and thus moves with the applied position A as the pads wear down with use.

As discussed above, severe operating conditions may force piston 24 into bore 22 to a knock-back position, K, resulting in an undesirable clearance, C. On the next brake application, the operator will have to depress the brake pedal much farther than desired to fill chamber 26 with sufficient fluid to apply the brakes. Knock-back position K is not a predetermined position; rather it may be any position beyond the retracted position R to which the piston is moved in a knock-back event. To prevent piston 24 from being forced from the normal retracted position, R, to the knock-back position, K, the present invention incorporates a linkage 36. Linkage 36, preferably a shaft with a threaded end 38, is arranged adjacent to piston 24 and movable between first, F, and second, S, positions. Specifically, a rod 40 is integrally formed with piston 24 and extends therefrom toward end 38, with end 38 forming a stop with respect to rod 40 of piston 24, since the linkage 36 cannot be mechanically back driven by piston 24. A support 42 is secured to housing 18 within bore 22 for supporting linkage 36. Support 42 has a hole 44 for at least partially receiving rod 40 and a threaded portion 46 for threadingly receiving end 38 of linkage 36.

An actuator 50 is used to rotatingly drive linkage 36 to eliminate the clearance between rod 40 and linkage 36 by moving linkage 36 from the first position, F, to the second position, S. In the second position, linkage 36 abuts rod 40. Since linkage 36 is supported by support 42, which is secured to housing 18, rod 40 is prevented from moving inwardly relative to housing 18. In this manner, actuator 50 eliminates the clearance to prevent piston 24 from moving within bore 22 away from rotor 14 from the normal retracted position, R, to the knock-back position, K, in response to severe operating conditions.

Preferably, actuator 50 is an electric motor commanded by a controller 52. Actuator 50 is supported by an actuator housing 54 that includes a body 56 with a hexagonal cross-section and a threaded end 58 fastened to housing 18. A seal 59 is arranged between actuator housing 54 and housing 18 to prevent hydraulic fluid leakage. Actuator housing 54 secures support 42 to housing 18. The interior of actuator housing 54 has a key way 60 that receives a key 62 which is secured to actuator 50 to prevent rotation of actuator 50 relative to actuator housing 54. As actuator 50 drives linkage 36, actuator 50 moves axially within actuator housing 54 and relative to support 42.

Controller 52 is electrically connected to actuator 50 at electrical connector 64. Connector 64 is shown rotated 90° in FIG. 1 for clarity. Controller 52 is preferably part of an overall brake or chassis control comprising a digital microcomputer with a subroutine provided for controlling actuator 50 in response to an end of brake activation signal from a brake sensor 70 responsive to, for example, a brake pedal position or force or a brake hydraulic (master cylinder) pressure, and also from apparatus for determining a stall condition of the actuator 50, such as a motor stall current sensor, not shown. In operation, piston knock-back is prevented with the present invention by sending an adjustment signal for the stop 38 from controller 52 to actuator 50 at a predetermined interval of time after a brake demand signal from the brake demand device ceases. The time duration is just sufficient to allow piston 24 to be moved back to its retracted position by retraction seal 30. The adjustment signal ordinarily activates the motor to attempt to drive linkage 36 to move the stop toward the brake disk until it engages piston 24. Actuator 50 is a relatively weak electric motor. Specifically, actuator 50 has insufficient power to force piston 24 past retraction seal 30 when rotatingly driving linkage 36. As a result, actuator 50 experiences a stall condition once linkage 36 has reached the second position, S, and linkage 36 abuts rod 40. A stall signal is generated, for example from the increase in motor current, and provided to controller 52. Accordingly, the adjustment signal is terminated when actuator 50 reaches the stall condition and the stop 38 is left engaged with piston 24. The linkage is not back-drivable by the piston, even when piston 24 is knocked by brake disc 14; and the piston 24 is thus prevented from moving from the normal retracted position, R, to the knock-back position, K. The engagement of stop 38 with piston 24 is accomplished as soon as is practical after retraction of the piston to its retracted position so that the stop can prevent further, knock-back movement of piston 24 past its retracted position for the entire duration of the period in which the brake is not applied. Occasionally, at predetermined times or specified numbers of brake applies, or in response to a special signal, the motor may first be briefly activated to back the stop some distance away from the piston before being reversed to advance into engagement with the piston. This will allow correction if the retracted position of the piston should happen to be advanced too far toward the brake disc.

The positioning of stop 38 to prevent knock-back is automatically adjusted in this described process to compensate for brake pad wear. As brake pads 12 wear and the piston must be pushed further toward the disc to engage the pads therewith, the retracted position R will follow the applied position A due to the action of the retraction seal 30; and the stop 38 will automatically follow through the anti-knock-back action described herein advancing the stop 38 with the retracted position R.

The present invention may also be used as an electric parking brake. Linkage 36 further includes a park brake position, P, which is adjacent to the second position, S, and opposite the first position, F. During a parking brake sequence, the brakes are first applied hydraulically to a predetermined pressure, either manually by the vehicle operator or by an automatic control initiated by the vehicle operator. A park brake signal is then provided to controller 52; and the latter commands actuator 50 to move linkage 36 to engage piston 24 in the park brake position, P, that has already been achieved hydraulically. The park brake apply signal may come from a switch located in the vehicle cabin that is operable by the vehicle operator or may be generated automatically as part of a parking brake control sequence. The hydraulic pressure is then released; and the stop will then hold the brakes applied in the park brake position until a release sequence is initiated. The parking brake is released when the controller (1) hydraulically activates the brakes to a pressure slightly greater than that exerted in the park brake position P so as to unload the linkage 36, (2) commands the actuator to move linkage 36 back away from the park brake position, P, to a position such as the first position, F, (3) releases the hydraulic brake pressure to allow the piston to be retracted by the retracting seal 32, and (4) advances the stop 38 once more into engagement with the piston 24 in the retracted position. In this manner, linkage 36 will be regularly adjusted to accommodate brake pad 12 wear.

What is claimed is:

1. A disc brake caliper assembly comprising:
   a housing having a bore;
   a disc and a pad engagable therewith;
   a piston disposed within the bore movable between an applied position in which it causes the pad to engage the disc, a retracted position in which the pad is disengaged from the disc and a knock-back position beyond the retracted position, the piston being activatable by hydraulic pressure to move from the retracted position to the applied position;

a retracting seal effective in the absence of the hydraulic pressure to move the piston from the applied position to the retracted position;

a linkage adjacent to the piston and carrying a stop, the stop being movable by the linkage;

an actuator responsive to an end of brake activation signal to cause the linkage to engage the stop with the piston when the piston is retracted from its applied position to its retracted position so as to prevent the piston from moving from the normal retracted position to the knock-back position, the actuator being ineffective to move the piston, through the linkage and stop, from the retracted position to the applied position; and a brake pedal activated sensor for providing the end of brake activation signal.

2. A disc brake caliper assembly comprising:

a housing having a bore;

a disc and a pad engagable therewith;

a piston disposed within the bore movable between an applied position in which it causes the pad to engage the disc, a retracted position in which the pad is disengaged from the disc and a knock-back position beyond the retracted position, the piston being activatable by hydraulic pressure to move from the retracted position to the applied position;

a retracting seal effective in the absence of the hydraulic pressure to move the piston from the applied position to the retracted position;

a linkage adjacent to the piston and carrying a stop, the stop being movable by the linkage;

an actuator responsive to an end of brake activation signal to cause the linkage to engage the stop with the piston when the piston is retracted from its applied position to its retracted position so as to prevent the piston from moving from the normal retracted position to the knock-back position, the actuator being ineffective to move the piston, through the linkage and stop, from the retracted position to the applied position, wherein said actuator comprises an electric motor for rotatingly driving said linkage to stall with the stop engaging the piston.

3. The assembly according to claim 2, the actuator further comprising a controller electrically connected to the motor, the controller commanding motor activating current in response to receipt the end of brake activation signal and commanding cessation of motor current in response to receipt of a motor stall signal.

4. A method of preventing piston knock-back in a disc brake caliper assembly, the method comprising the steps of:

(a) applying a hydraulic pressure to activate a piston in a first direction from a retracted position in which a brake pad is spaced from a brake disc to an applied position in which the brake pad is engaged with the brake disc for braking and in which a retracting seal is resiliently distorted;

(b) releasing the hydraulic pressure to permit the retracting seal to move the piston in a second direction opposite the first direction to the retracted position;

(c) when the piston reaches the retracted position, activating an electric motor to activate a linkage moving a stop in the first direction into engagement with the piston, the stop then defining a stop position;

(d) maintaining the stop in the stop position to prevent piston knock-back movement in the second direction past the retracted position while the piston is not activated; and (e) terminating the activation of the electric motor when a sensed operating current of the electric motor indicates a stall condition.

5. The method according to claim 4 further comprising the step of:

(f) sensing with a brake sensor that braking action of the disk brake caliper assembly is ended and generating an end of brake activation signal, and wherein the step of activating a linkage is initiated a predetermined time after generation of the end of brake activation signal.

* * * * *